Patented Jan. 23, 1945

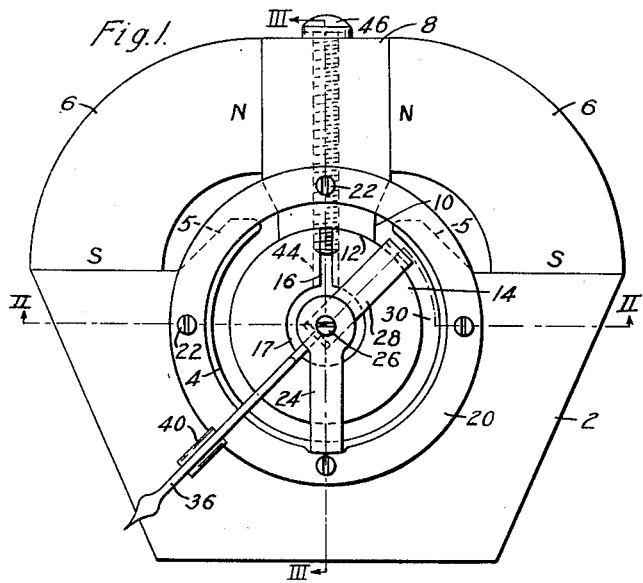
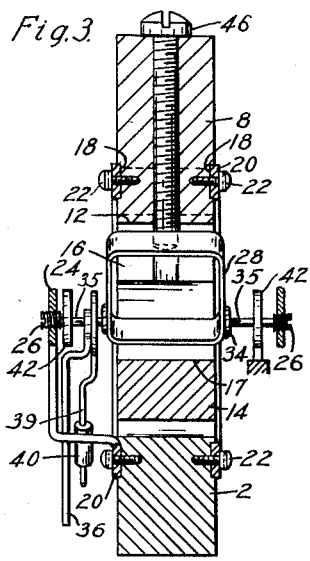
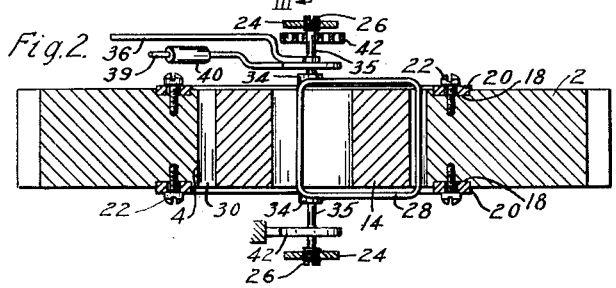
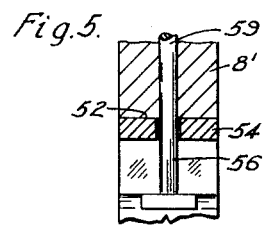
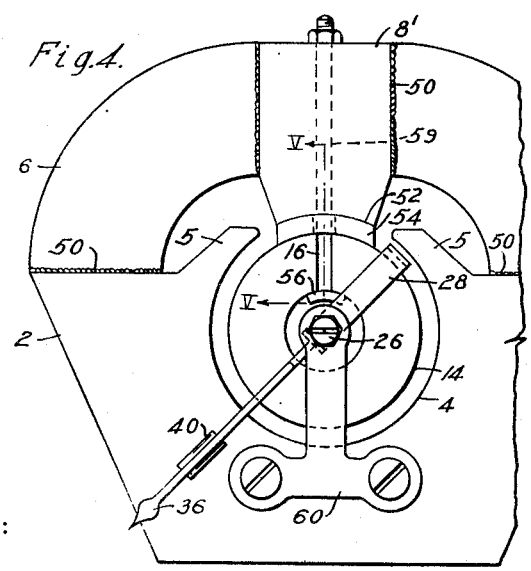
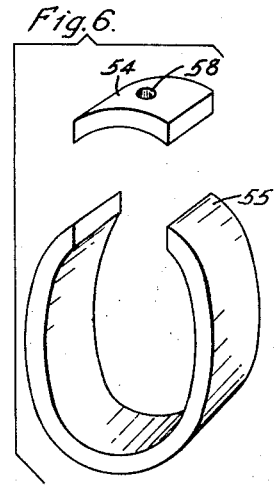

2,367,950

UNITED STATES PATENT OFFICE 2,367,950

ELECTRICAL MEASURING INSTRUMENT

Bernard E. Lenehan, Bloomfield, N. J., assignor to Westinghouse Electric & Manufacturing Company, East Pittsburgh, Pa., a corporation of Pennsylvania Application March 6, 1942, Serial No. 433,625

5 Claims. (Cl. 171—95)

The present invention relates to electrical measuring instruments and it has particular relation to instruments of the movable-coil permanent-magnet type which are designed to provide indications of a long scale range.

In the present invention a long scale range is obtained by means of an inner annular pole piece surrounded by an outer pole piece of conforming shape over a major portion of its periphery to provide a uniform air gap therebetween. An intermediate or yoke member is provided with an inner surface adapted to engage the surface of the annular pole piece while permanent magnet members of high coercive force extend between the ends of the outer pole piece and adjacent sides of the intermediate member to provide the desired magnetic flux. In a preferred form of the invention the outer structure comprising the outer pole piece, intermediate member and permanent magnets is provided with annular grooves extending into each of these members comprising it. Ring members carrying supporting bridges are disposed in the annular grooves to secure the structure in assembled relationship and provide concentric bearings for a current conducting coil which is movable within the air gap and through which the annular pole member is threaded. The resulting construction is extremely compact since the main magnetic supporting structure need be made only slightly larger than the diameter of the air gap.

It is accordingly an object of the present invention to provide an improved long scale-range electrical measuring instrument.

Another object of the invention is to provide a compact movable-coil, permanent magnet type measuring instrument of a design which has a long scale-range and is capable of quantity manufacture and assembly.

A further object of the invention is to provide an improved compact magnetic structure for use in measuring instruments of the movable-coil permanent-magnet type.

Other objects and advantages of the invention will appear from the following detailed description read in connection with the accompanying drawing in which like reference characters refer to like parts throughout.

In the drawing

Figure 1 is a plan view of a measuring instrument embodying the present invention and having its outer casing portion removed;

Fig. 2 is a vertical sectional view taken along the line II—II of Fig. 1;

Fig. 3 is a sectional view taken along the line III—III of Fig. 1;

Fig. 4 is a plan view similar to Fig. 1 of a modified form of the invention;

Fig. 5 is a vertical sectional view of a portion of the apparatus of Fig. 4 taken along the line V—V thereof; and Fig. 6 is a perspective view illustrating a method for producing the magnetic insert member employed in the structure of Figs. 4 and 5.

Referring to the device shown in Figs. 1 through 3 of the drawing, an outer pole piece 2 of substantially C-shape has an inner cylindrical surface 4 and pole tips 5. Curved permanent magnets 6 each have one end abutting an end of the C-shaped pole piece 2 while the other ends curve about the pole tips 5 to abut opposite sides of an intermediate or yoke member 8 of magnetic material.

The permanent magnets 6 are preferably of a high coercivity and may, for example, be made of a high aluminum, nickel-steel such as that including 20% nickel, 12% aluminum and 5% cobalt.

The intermediate member 8 has a portion 10 of reduced cross-section between the ends of pole tips 5. The inner surface 12 of this intermediate member is of segmental cylindrical shape for engagement with the outer surface of a cylindrical inner pole piece 14. This inner pole piece has a slot 16 which extends radially from an axial opening 17 which is concentrical with respect to the surface 4 of the outer pole piece 2 and the surface 12 of the intermediate member 8.

Annular grooves are formed in the upper and lower surfaces of the outer pole piece 2, the permanent magnets 6 and the intermediate member 8 to receive rings 20. These rings 20 are secured to the parts, which form the outer magnet structure of the instrument, by means of machine screws 22 and insure that the various parts are maintained in the desired relative positions. In addition, each of the rings 20 includes an outwardly extending bracket 24 which supports a jeweled bearing member 26 in alignment with the center of the surface 4.

A current conducting coil 28, which is preferably wound on a light aluminum frame in a usual manner, is of such a size as to extend through the air gap 30 between the pole pieces and through the axial opening 17 in the annular pole piece 14. Attached to each side of this coil near its inner portion, as by cementing, is a metal strip 34 supporting an outwardly extending stud 35 for engagement with the corresponding jeweled bearing 26 to maintain the coil in a pivoted position in the air gap for movement about the axis of the surface 4. With this preferred construction no shaft is required and the inside edge of the coil helps to balance the movement so that less counterweight is needed. The resulting increase in mechanical efficiency will generally more than compensate for the reduced electrical efficiency caused by the increase in length of the mean turn of the coil.

It will be understood that the accurate alignment of the parts and the location of the pivotal axis of the moving coil is of utmost importance in an instrument of this type. By use of the ring 20 carrying the bracket 24, it becomes a relatively simple job to assemble the parts in their proper positions with the speed required in quantity production.

A pointer 36 is secured to the upper stud 35 in any suitable manner. This pointer is preferably disposed on the opposite side of the pivotal axis of the movable coil 28 to aid in counter-balancing it, and an additional balance arm 39, carrying an adjustable weight 40, may also be secured to the stud 35. A helical biasing spring 42 is attached to each stud 35 and to a stationary portion of the instrument or casing to bias the pointer to its zero position. These spring members 42 may, in addition, be employed as leads to the current carrying coil 28 in a manner well known in the art.

A screw-threaded hole 44 is formed in the annular pole piece 14 at or near the location of the radial slot 16 for engagement by a machine screw 46 extending through an aligned opening in the intermediate magnetic member 8 in order to releasably secure this inner pole piece in the desired concentric position.

The grooves 18 will preferably be formed in the members while they are temporarily retained in the desired positions. The ring members 20 may then be located in these grooves to secure them in this position while the annular pole piece 14 is in position between the brackets. The movable coil 28 having previously been placed about this pole piece by extending one side of the coil through the radial slot 16, the pole piece 14 may then be finally positioned by means of the machine screw 46.

In the modification of the invention shown in Figs. 4 and 5 the outer pole piece 2, permanent magnets 6 and an intermediate magnetic member 8' are secured in a relationship similar to that described above by means of silver soldering, or the like, along the abutting surfaces as at 50. These pieces having been previously only rough finished to their inside dimensions, the inner cylindrical surface 4 is turned in the outer pole piece 2 and at the same time an inner surface 52 of similar shape is formed on the inside portion of the intermediate member 8' so that the surfaces 4 and 52 are concentric. A magnetic insert member 54 having an outer surface conforming in shape and dimensions to the inner surfaces 52 of the intermediate member, and an inner surface conforming to the surface of the annular inner pole piece 14, is disposed between intermediate member 8' and this inner pole piece. A T-shaped machine screw 56 extends through the slot 16 in the annular pole piece, an opening 58 in the insert member 54 and a central opening in the intermediate member to secure the inner pole piece in concentric relationship within the surface 4.

A movable coil 28 of the same general design previously described is secured in similar relationship to the inner pole piece 14 for pivotal movement in the air gap about jeweled bearing members 26 carried by supporting brackets 60.

The insert 54, for use between the intermediate member 8' and the annular pole piece, may conveniently be formed by finishing the outer surface of a tube 55 (Fig. 6) of magnetic material to the diameter of the inner surface 4 of the outer pole piece while the inner surface is bored to a radius corresponding to that of the cylindrical inner pole piece. A piece of the desired segmental length may then be cut out as indicated in Fig. 6.

It will appear from the foregoing description that the present invention provides a structure which is particularly compact to provide an instrument of the minimum weight and size with a desired long scale length. In addition, the particular magnetic structure employed insures that the parts may readily be assembled in the proper physical and electrical relationship to reduce inaccuracies to a minimum.

Since various modifications of the particular embodiments of the invention described above will appear to those skilled in the art, it is intended that the invention shall be limited only by the spirit and scope of the appended claims.

I claim as my invention:

1. In an electrical measuring instrument, a substantially C-shaped outer pole piece having an inner surface in the form of a portion of the surface of a cylinder, an inner cylindrical pole piece having a central opening therein, said inner pole piece being of a lesser diameter than the diameter of the inner surface of said outer pole piece to provide a uniform air gap therebetween when disposed concentrically therewith, a magnetic member having an inner surface conforming to a portion of the cylindrical surface of said inner pole member and opposite side surfaces disposed intermediate the open portion of said outer pole piece with its inner surface concentric with the inner surface of said outer pole piece, a permanent magnet disposed between each end of said outer pole piece and the respective adjacent side surface of said intermediate member in abutting relationship thereto, said outer pole piece, and intermediate member being grooved on opposite sides to provide a pair of annular grooves concentric with the inner surface of the outer pole piece, means supporting said inner pole piece concentrically within said outer pole piece in contact with the inner surface of said intermediate member, a current conducting coil disposed about said inner pole piece with the latter in threaded relation therethrough, and ring members disposed in said annular grooves and attached to the members defining said grooves to secure them in the proper relative positions, said rings including members for pivotally supporting said coil concentrically with the air gap.

2. In an electrical measuring instrument, a substantially C-shaped outer pole piece having a. inner cylindrical surface portion, an intermediate magnetic member having an inner surface of substantially the same curvature as the inner surface of said pole piece, a pair of curved permanent magnets each disposed in abutting relationship between a separate end of said pole piece and a corresponding side of said intermediate member to form a closed structure with the inner surface of said intermediate member lying substantially along the extension of the cylindrical inner surface of said pole piece, a cylindrical inner pole piece of lesser diameter than said inner cylindrical surface having a central opening and a slot extending from said opening to its outer surface, a magnetic insert having opposite surfaces conforming respectively to the shape of the inner surface of said intermediate member and the outer surface of said inner pole piece with an opening therein, means extending through said slot and the opening in said insert into said intermediate member to secure said inner pole piece concentrically within the surface of said outer pole piece and form a uniform air gap therebetween, a current conducting coil designed for assembly through the slot in said inner pole piece to a position with the latter threaded therethrough, means mounting said coil for pivotal movement through said air gap about the center of said pole pieces, means securing said mounting means to said outer pole piece, and means securing said mounting means to said inner pole piece to position said coil with respect to said pole pieces.

3. In a moving coil instrument, a magnetic unit comprising a magnetic inner pole piece having an opening extending therethrough, a coil having a first side positioned in said opening, and having a second side positioned externally of said pole piece, said coil being rotatable about an axis passing through said opening, an outer magnetic pole member spaced from said inner pole piece and having a surface substantially surrounding said inner pole piece, said surface being spaced from said inner pole piece to define an air gap through which said second side of said coil moves during rotation of said coil about said axis, permanent magnet means extending between said inner pole piece and said outer magnetic pole member for producing a magnetic field in said air gap, and bearing means for said coil, said bearing means comprising a supporting element, a bearing element for said coil secured to said supporting element, means securing said supporting element to said inner pole piece, and means securing said supporting element to said magnetic pole member, whereby said supporting element positions said magnetic pole member and said inner pole piece relative to each other and relative to said axis, said supporting element including a ring having said axis as a center, said magnetic inner pole piece and said outer magnetic pole member having arcuate grooves proportioned to receive snugly said ring.

4. In a permanent magnet, moving coil instrument, a magnetic structure comprising a first magnetic element, a second magnetic element spaced from said first magnetic element, and a pair of spaced permanent magnets extending between said magnetic elements to form therewith a substantially continuous magnetic structure having a centrally disposed opening therein, a cylindrical magnetic inner pole piece member having a radial recess extending axially therethrough, said pole piece member being disposed in said opening in engagement with said first magnetic element, said first magnetic element having an arcuate surface conforming to the cylindrical surface of said inner pole piece member for engaging said inner pole piece member and bridging said recess, and said pole piece member having a substantial portion spaced from said permanent magnets, a coil having a first side positioned in said recess, said coil having a second side positioned externally of said pole piece member, means mounting said coil for rotation about an axis passing through said recess, said second magnetic element comprising an outer magnetic pole member spaced from said inner pole piece member and having a surface surrounding said inner pole piece member for a substantial distance, said surface being spaced from said inner pole piece member to define an air gap through which said second side of said coil moves during rotation of said coil about said axis, and securing means passing through the engaging surfaces of said inner pole piece member and said first magnetic element for urging said surfaces towards each other, whereby operation of said securing means accurately positions said inner pole piece member, said securing means extending radially relative to said inner pole piece member into said recess.

5. In a moving coil instrument, a magnetic unit comprising a cylindrical magnetic inner pole piece having an opening extending axially therethrough, said inner pole piece having a slot through which a coil may be introduced into said opening, a coil having a first side positioned in said opening, and having a second side positioned externally of said pole piece, said coil being rotatable about an axis passing through said opening, an outer magnetic pole member spaced from said inner pole piece and having a cylindrical surface of predetermined radius substantially surrounding said inner pole piece, said surface being spaced from said inner pole piece to define an air gap through which said second side of said coil moves during rotation of said coil about said axis, a magnetic spacer bridging said slot, said magnetic spacer having an inner cylindrical surface conforming to the engaged surface of said inner pole piece, and said magnetic spacer having an outer cylindrical surface concentric with said inner pole piece, said last-named cylindrical surface having a radius equal to said predetermined radius, a magnetic element having a surface engaging and conforming to the outer cylindrical surface of the spacer, said magnetic element being spaced from said outer magnetic pole member, permanent magnet means extending between said magnetic element and the outer magnetic pole member for producing a magnetic field in said air gap, and securing means positioned in said slot and said magnetic element and extending through said spacer for securing said inner pole piece to said magnetic element.

BERNARD E. LENEHAN.